Figure 1:
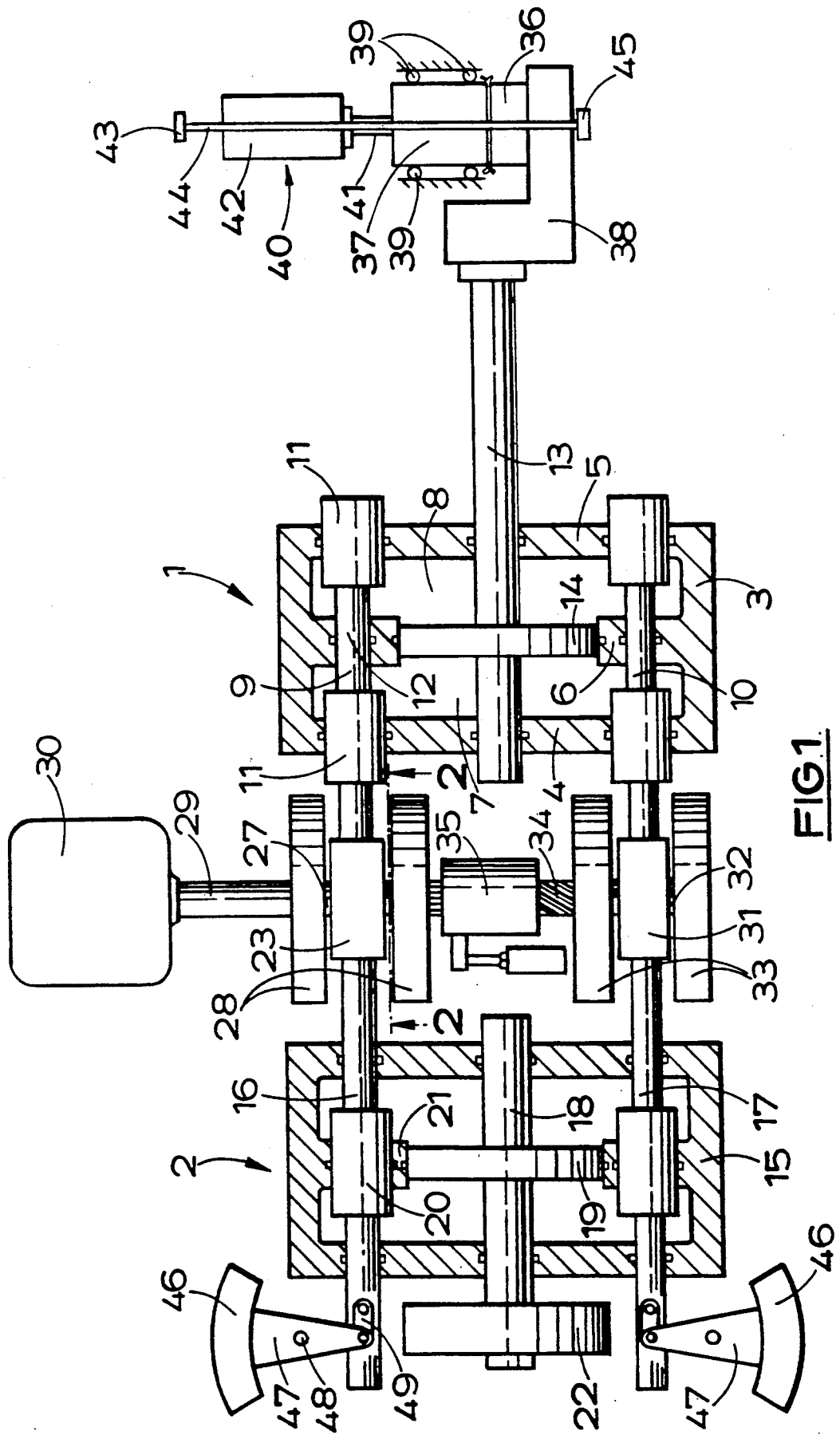

United States Patent [19]

Searle

[11] Patent Number: 5,100,044

[45] Date of Patent: Mar. 31, 1992

[54] FRICTION WELDING

[75] Inventor: John G. Searle, Hednesford, England

[73] Assignee: Allwood, Searle & Timney (Holdings) Limited, England

[21] Appl. No.: 669,395

[22] PCT Filed: Sep. 15, 1990

[86] PCT No.: PCT/GB89/01087

§ 371 Date: Mar. 12, 1991

§ 102(e) Date: Mar. 12, 1991

[87] PCT Pub. No.: WO90/03245

PCT Pub. Date: Apr. 5, 1990

[30] Foreign Application Priority Data

Sep. 21, 1988 [GB] United Kingdom ............... 8822235

[51] Int. Cl.⁵ ............................................ B23K 20/12
[52] U.S. Cl. ........................................ 228/112; 228/2
[58] Field of Search .............. 228/112, 113, 114, 2 N, 228/2

[56] References Cited

U.S. PATENT DOCUMENTS

| | | | |
|---|---|---|---|
| 3,323,203 | 6/1967 | Hollander et al. | 228/113 |
| 3,542,275 | 11/1970 | Loyd | 228/2 |
| 3,613,218 | 10/1971 | Kiwalle | 228/113 |
| 3,627,189 | 12/1971 | Ditto | 228/2 |
| 3,725,998 | 4/1973 | Searle | 228/112 |
| 3,972,465 | 8/1976 | Takaoka et al. | 228/112 |

Primary Examiner—Richard K. Seidel
Assistant Examiner—Chuck Y. Mah
Attorney, Agent, or Firm—Leydig, Voit & Mayer

[57] ABSTRACT

A friction welding reciprocator comprises first chamber means defining a first chamber containing a substantially fixed volume of hydraulic fluid, second chamber means defining a second chamber containing a substantially fixed volume of hydraulic fluids, reciprocable driving means comprising a plurality of individual reciprocable elements, reciprocable driven means, a reciprocating mechanism operatively connected to said reciprocable elements, and adjustment means; wherein reciprocation of said reciprocable elements by said reciprocating mechanism causes a local variation in the shape and volume of said first chamber and complementary local variation in the shape and volume of said second chamber, and wherein said reciprocating mechanism is couplable to said reciprocable elements so as to cause reciprocation of said elements at the same frequency with unvarying amplitudes, and said adjustable means is adjustable to vary the relative phases of reciprocation of said reciprocable elements to a condition where the sum of the said local variations in shape and volume of each of said chambers resulting from movement of said reciprocable elements is reduced to zero thereby achieving an amplitude of reciprocation of said driven means of zero.

9 Claims, 4 Drawing Sheets

FRICTION WELDING

This invention relates to friction welding.

In one method of friction welding two components together, a first one of the components is caused to reciprocate while in contact with the other or second component, the two components being pressed together so that frictional heat is generated between the components. When sufficient heat has been generated to enable welding to be effected, relative reciprocatory movement between the components is caused to cease and the components are pressed together so that they become welded together.

It is usual for the second component to remain stationary, or substantially stationary during the generation of frictional heat. In the description of the present invention that follows, it will be assumed that the second component does indeed remain stationary, or substantially so; nevertheless it is to be understood that in making use of the invention the second component may also be caused to reciprocate or may be caused to move in some other manner during the generation of frictional heat.

Difficulties can arise in designing mechanism for causing reciprocation of the first component. The difficulties can be particularly severe when the components to be welded together are made of metal and have to be raised to a relatively high temperature before welding can be effected Difficulties may arise, for example, from the facts that the first component must be caused to reciprocate rapidly, typical rates of reciprocation being between 1000 and 6000 complete oscillations per minute, that the frictional resistance forces that must be overcome are not only relatively high, typically between 500 and 1000 kN, but also vary during the frictional generation of heat, and that the relative movement between the components must be stopped rapidly when the required temperature has been reached and the components must then be located in predetermined relative positions before they are welded together.

An aim of the present invention is to enable at least some of those difficulties to be reduced or overcome.

From a first aspect the present invention consists in a reciprocator for use in apparatus for friction welding, the reciprocator comprising first and second chambers of variable shape for containing hydraulic fluid, and reciprocable driving means and reciprocable driven means each of them so arranged that on reciprocation it causes a local variation in the volume of the first chamber and a complementary local variation in the volume of the second chamber, the arrangement being such that, in the absence of other variations in the shape of the chambers and when each chamber contains a fixed volume of hydraulic fluid so that the volume of each chamber remains constant, reciprocation of the driving means with any given amplitude causes reciprocation of the driven means with a smaller amplitude but with an increased force, characterised in that the driving means comprises a plurality of individually reciprocable elements each so arranged that on reciprocation it causes a local variation in the volume of the first chamber and a complementary local variation in the volume of the second chamber, reciprocating mechanism operative to cause the elements to reciprocate at the same frequency with unvarying amplitudes, and adjustment means operative to enable the relative phases of reciprocation of the elements to be adjusted, whereby the sum of the local variations in volume of each chamber attributable to the reciprocation of the elements can be varied down to zero.

In a preferred construction of reciprocator the first and second chambers are disposed on opposite sides of a common dividing wall, and the driving means extends through a hole or holes in that dividing wall. Similarly in a preferred construction the first and second chambers are disposed on opposite sides of a common dividing wall, and the driven means extends through a hole in that dividing wall. When, as is preferred, both of those preferred constructions are adopted, the holes are preferably formed in the same common dividing wall.

Local variations in volume of a chamber, such as are referred to above may be effected by sliding movement of a component in a hole in a wall of the chamber. Alternatively it may be effected by flexing movement of a bellows, diaphragm or the like. The manufacture and assembly of apparatus in which components are slidably mounted in holes may be relatively simple, although sealing formations and/or sliding seals may be required to ensure that there is no significant loss of fluid from the chamber concerned. The use of a bellows or a diaphragm or a similar device is generally more complex, but can enable seals to be formed such that there is then little or no opportunity for fluid to leak from the chamber concerned.

An advantage of a reciprocator embodying the present inventions is that it enables reciprocatory movement of the driving means, carried out with a relatively large amplitude but with the exertion of forces that are not unduly large, to result in reciprocatory movement of the driven means with a smaller amplitude, such as is appropriate for friction welding, but such as to exert larger forces with which to enable the first component to overcome the resistance it encounters during the frictional generation of heat.

In carrying out friction welding it is usually desirable, and indeed often essential, for the first and second components to be brought into predetermined relative positions after they have been heated but before they are welded together. A preferred form of reciprocator is such as to enable the amplitude of reciprocatory movement of the driven means to be rapidly but progressively reduced to zero at an appropriate stage in the process. When employing apparatus in accordance with the first aspect of the present invention, this may be effected by reducing the amplitude of reciprocation of the driving means. This may be done with the aid of variable-throw crank mechanism.

There are preferably two reciprocable elements arranged to operate in that manner. It would, at least in theory, be possible to employ more than two reciprocable elements but this would usually be unnecessarily complicated.

The reciprocatory movement of each of the elements is preferably simple harmonic movement so that the sum of the local variations in volume of each chamber itself of simple harmonic form, being the sum of simple harmonic variations of the same frequency. In consequence, the resultant reciprocatory movement of the driven means, in the absence of any other local variations in the volume of each chamber, is also in the form of simple harmonic motion.

Each of the reciprocable elements is preferably provided with associated conversion mechanism operative to convert the rotation of an associated rotary member into the required reciprocatory movement for the element concerned, there being a common rotary input for rotating the rotary members, and the adjustment means being operative to vary the relative angular or rotatory positions of the rotary members while they are rotating. The conversion mechanism may comprise a Scotch crank or the like.

When a reciprocator of the kind described above is in use, there are resultant reciprocatory forces which, if unbalanced, will be applied to the base, frame or other stationary part With a view to overcoming or at least reducing that problem, the reciprocator is preferably provided with balancing means The balancing means preferably comprises counterweight means and operating means operative to move the counterweight means in opposition to the reciprocal movement of a component of the reciprocator.

The counterweight means may be mounted for reciprocatory movement and coupled to a reciprocatory component of the reciprocator through the intermediary of pivoted rocker means connected to the counterweight means and to the reciprocatory component by flexible elements which in use flex to accommodate relative movement between the rocker means and the counterweight means and between the rocker means and the reciprocatory component.

Alternatively the balancing means may comprise first and second chambers, and reciprocable driving means and driven means similar to those of the reciprocator but operative to cause the movements of driven means of the balancing means to be opposite to those of the driving means of the reciprocator so as to balance the reciprocatory forces generated by the driven means of the reciprocator.

The driving means of the balancing means may similarly be caused to reciprocate in a manner equal and opposite to the driving means of the reciprocator. In a preferred form of reciprocator, however, the driving means of the balancing means is driven in unison with the driving means of the reciprocator, and the movement of the combined driving means is largely or wholly balanced by one or more balance weights caused to move in opposition to the driving means.

Whichever form of reciprocator is used, it preferably includes one or more flywheels operative temporarily to provide or absorb energy when there are changes in the frictional resistance between the components to be welded together and to reduce cyclical variation in angular velocity that tends to occur as kinetic energy is exchanged between reciprocating and rotating parts. When a Scotch crank or similar conversion mechanism is used, it may in any case be necessary or at least highly desirable for one or more flywheels to be provided. In order to reduce or avoid the occurrence of forces that are out of balance, any Scotch crank or similar conversion mechanism is preferably provided with two or more flywheels so arranged that their centre of gravity is the same plane as the centre-plane of the crank or other conversion mechanism, normal to the axis of rotation.

From a second aspect the present invention consists in friction welding apparatus for use in welding together first and second components and comprising a reciprocator in accordance with the first aspect of the present invention, first carrier means for carrying said first component and so coupled to the driven means that in use it is reciprocated by the driven means, second carrier means for carrying said second component, and means operative to urge the second carrier means towards the first carrier means so that in use first and second components carried by said carrier means are pressed together.

Figure 2:
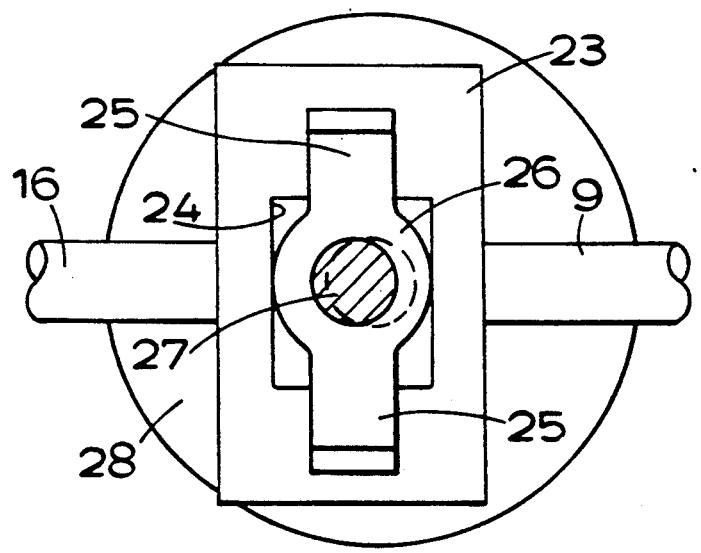
Figure 3:
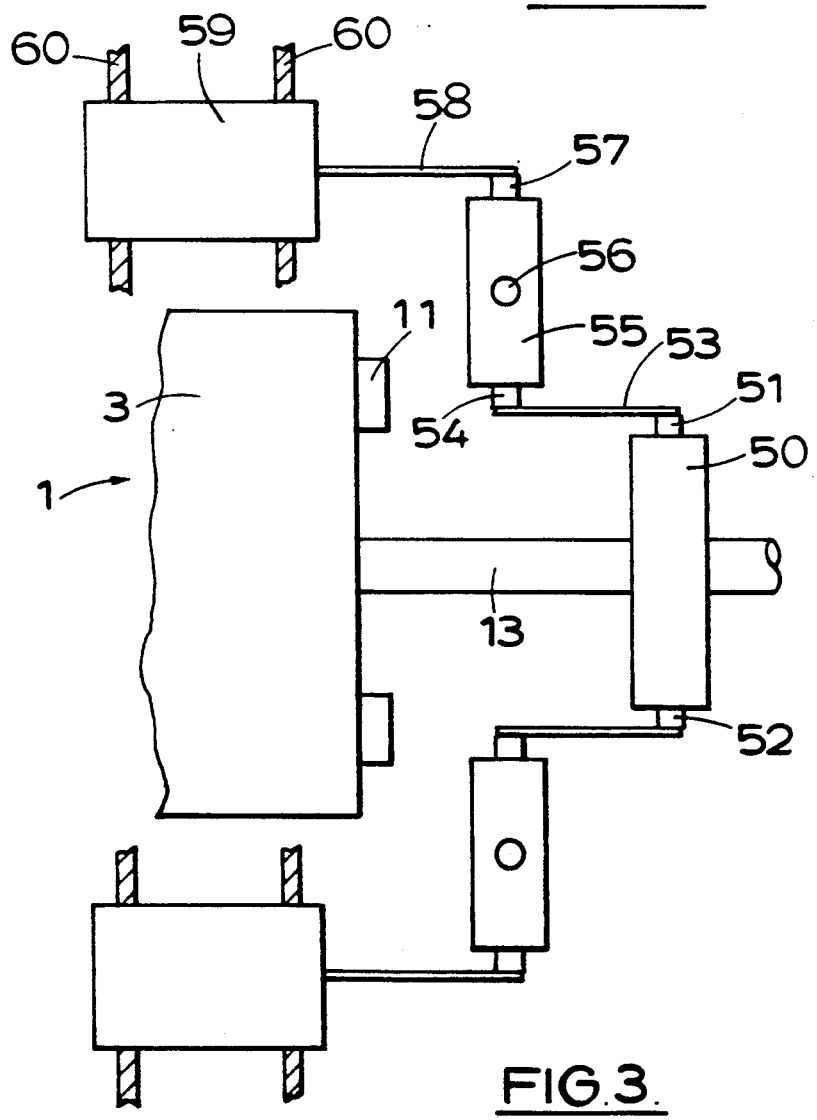
Figure 4:
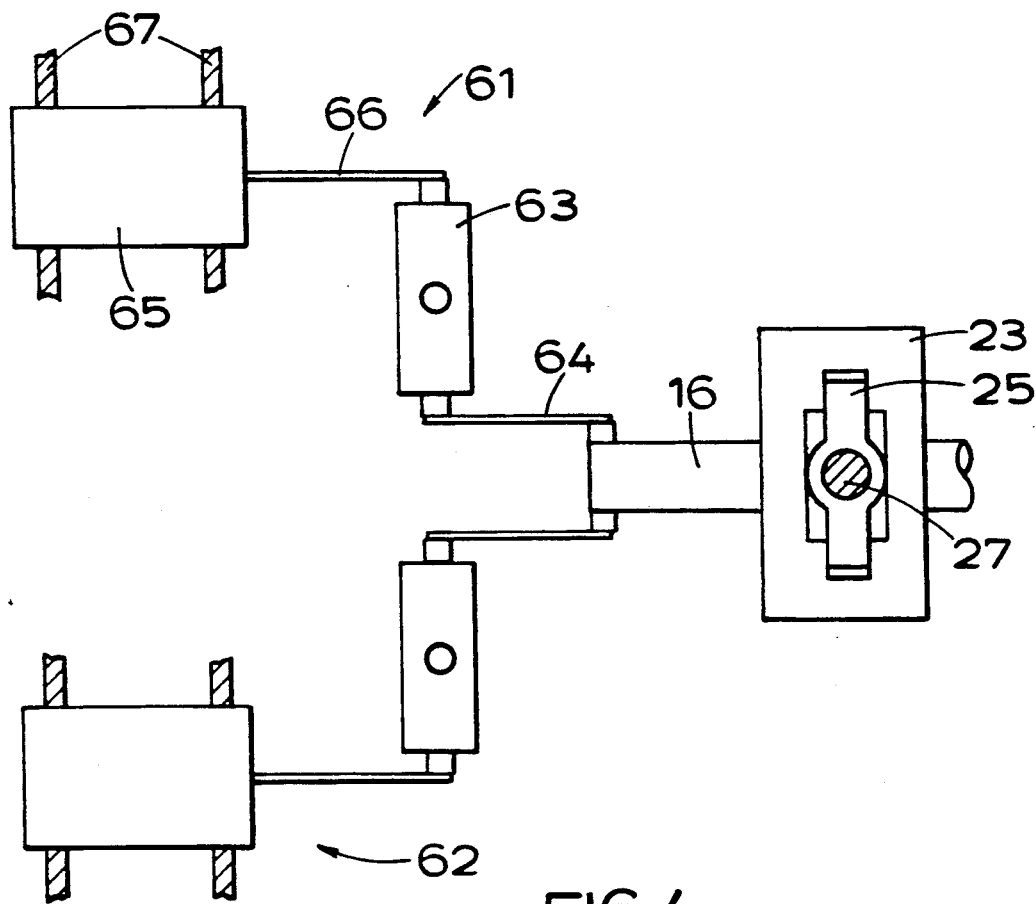
Figure 5:
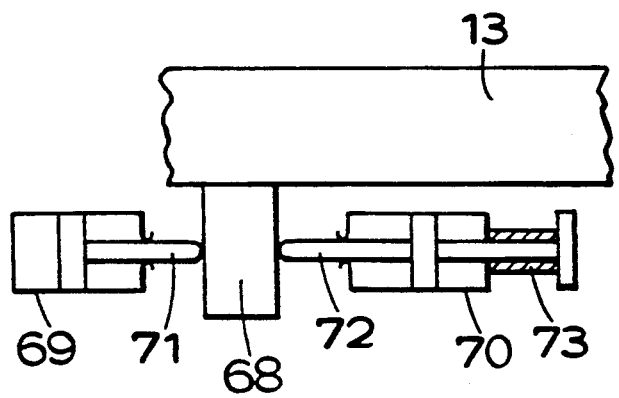
Figure 6:
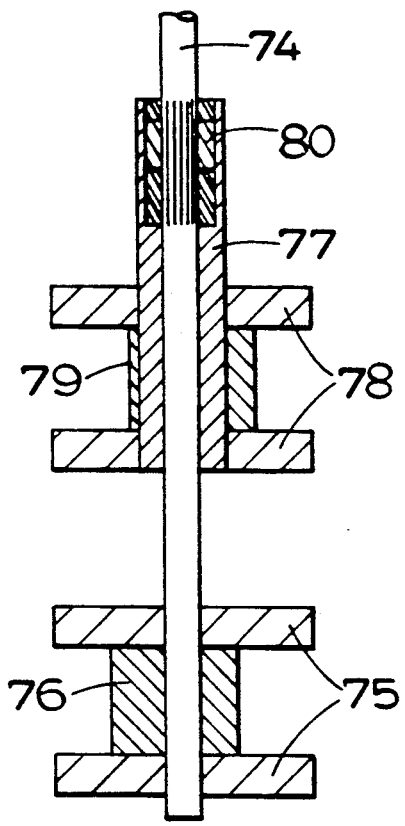

Embodiments of the present invention will now be described, by way of example only, with reference to the accompanying drawings, in which:

FIG. 1 is a plan view, partly sectioned, of friction welding apparatus in accordance with the present invention, FIG. 2 is a section, to a larger scale, along the line 2—2 of FIG. 1 but with a drive shaft rotated through 90°, FIG. 3 is a plan view of part of a modified form of the apparatus shown in FIG. 1, FIG. 4 is an elevational view of another part of that modified form of apparatus, FIG. 5 shows centering means for use with the apparatus shown in FIG. 1, and FIG. 6 is a section through an alternative device for causing reciprocation of the drive means.

The apparatus illustrated comprises a reciprocator 1 and balancing means 2. The reciprocator 1 comprises a housing 3 having parallel end walls 4 and 5 and a central dividing wall 6 half way between the end walls. The dividing wall 6 divides the interior of the housing into a first chamber 7 and a second chamber 8. The dividing wall 6 is common to both chambers and is formed with various holes that extend through it as described in more detail below. Each of the chambers contains hydraulic fluid; the quantity of fluid in each chamber remains constant or substantially constant while the apparatus is in use as described in more detail below.

Reciprocable driving means extends through the housing and comprises two parallel rods 9 and 10. Each of the rods extends through aligned holes in the end walls 4 and 5 and the central dividing wall 6 of the housing 3. Those portions 11 of which extend through holes in the end walls 4 and 5 are of greater diameter than the central portion 12 of each rod which extends through a hole in the dividing wall 6. Reciprocable driven means also extends through the housing and comprises a rod 13 carrying a piston 14 which is a running fit in a central hole in the dividing wall 6. Portions the rod 13 on either side of the piston extend through aligned, central holes in the end walls 4 and 5 of the housing.

The balancing means 2 is largely similar in construction to the reciprocator 1 in that it includes a housing 15 similar to the housing 3, driving means comprising two parallel rods 16 and 17, and driven means comprising a rod 18 and a piston 19. The rods 16 and 17 are respectively aligned with the rods 9 and 10. Each of the rods 16 and 17 has a portion 20 of the same diameter as the portions 11 and which extends through a hole in the dividing wall 21 of the housing 15, while those portions of the rod 16 and 17 that extend through holes in the end walls of the housing 15 are the same diameter as the central portions 12 of the rods 9 and 10.

The rod 18 of the driven means carries a counterweight 22 such as to make the total weight of the driven means of the balancing means equal to the total weight of the driven means of the reciprocator.

Adjacent ends of the rods 9 and 16 are connected to a Scotch crank mechanism comprising a body 23 formed with a transverse slot 24 which affords slideways for a slide-block comprising sliders 25 projecting from a collar 26. The collar is mounted on an eccentric pin 27 extending between a pair of flywheels 28. The flywheels are mounted on a drive shaft 29 rotated by a motor 30. Adjacent ends of the rods 10 and 17 are connected to a similar Scotch crank mechanism comprising a body 31 with a transverse slot for a slide-block mounted on an eccentric pin 32 extending between flywheels 33 on a shaft 34. Adjacent end portions of the shafts 29 and 34 are formed with splines; those on the shaft 29 are parallel with the axis of rotation but those on the shaft 34 are inclined at 30° to the longitudinal axes of the shafts. The end portions of the shafts enter a sleeve 35 which is formed internally with helical formations complementary to those on the shafts. An hydraulic ram is provided to enable the axial position of the sleeve to be adjusted. It will be appreciated that axial movement of the sleeve causes relative rotational movement between the shafts so that their relative rotary positions are changed. The inclination of the splines is such as to prevent axial movement of the sleeve being caused by torque applied to it by the shafts 29 and 34. Angles of inclination other than 30° may, or course, be used if desired.

The operation of the apparatus as thus far described is as follows. The sleeve 35 is adjusted to an end position in which the eccentric pins 27 and 32 are in axial alignment with each other, and the motor 30 is caused to rotate the shafts 29 and 34. The Scotch cranks cause the rods 9, 10, 16 and 17 to reciprocate in unison. The resultant movement of the enlarged portions 11 of the rods 9 and 10 causes local variations in the volume of the chambers 7 and 8. For example, as the rods 9 and 10 move to the right as viewed in FIG. 1, the enlarged portions 11 entering further into the first chamber 7 cause a local decrease in the volume of that chamber, while simultaneous movement of the enlarged portions moving further out of the second chamber 8 causes a complementary local increase in the volume of the second chamber. However, as the total volume of each of the first and second chambers remains constant, owing to the fact that the hydraulic fluid that fills them is for practical purposes incompressible, the piston 14 is caused to move to the right through a relatively small distance. When the rods 9 and 10 are reciprocating in phase with each other, the ratio of the distance travelled by each of the rods 9 and 10 to the distance travelled in consequence by the rod 13 is equal to the ratio between the combined areas of the exposed end faces of two of the enlarged portions 11 to the area of the exposed end face of the piston 14. That ratio may be between four and eight. As mentioned above, the arrangement leads to a mechanical advantage that, at least in theory, has the same value as that ratio. The ram is operated to shift the sleeve 35 axially. As the reciprocating movement of the rods becomes progressively out of phase, the ratio of the distance travelled by each of the rods 9 and 10 to the distance travelled in consequence by the rod 13 becomes progressively less, while the mechanical advantage increases.

Movement of the rods 16 and 17 has an effect similar to that of resulting from movement of the rods 9 and 10, but the piston 19 is shifted in the opposite direction to the piston 14 owing to the disposition of the enlarged portions 20.

The apparatus is illustrated as being set up for welding together two components 36 and 37. The first component, 36, is fixed to one limb of an L-shaped carrier 38, the other limb of which is connected to a projecting end of the rod 13. The second component, 37, is mounted between roller guides 39 so that it can be moved towards the first component but is prevented from lateral movement. An hydraulic ram 40 has a piston rod 41, which bears on the second component 37 and urges it into contact with the first component 36, and a cylinder 42, which exerts a reaction force on a transverse bar 43. The ends of the bar 43 are linked by flexible metal rods 44 to the ends of a similar transverse bar 45 which extends behind the carrier 38. In use, when the ram 40 operates to urge the second component 37 into contact with the first component 36, the reactive forces are transmitted to the transverse bars 43 and 45 so that the flexible rods 44 are in tension. Consequently no reactive forces are transmitted to the frame or base of the apparatus. It will be observed that the plane of contact between the components 36 and 37 contains the longitudinal axis of the rod 13.

When welding is to be effected, the apparatus is operated with the eccentric pins 27 and 32 in axial alignment with each other. This causes the rod 13 to reciprocate and frictional heat to the generated between the components 36 and 37. When the abutting faces of the components have reached the desired temperature, the sleeve 35 is rapidly shifted axially. This causes the shaft 34 to rotate through half a revolution relative to the shaft 29 so that the eccentric pins 27 and 32 become exactly out of phase. When this has occurred, the local variations in volume in the chambers caused by the enlarged portions 11 and 20 on the rods 9 and 16 are exactly balanced by the local variations in volume of the enlarged portions on the rods 10 and 17 so that the pistons 14 and 19 remain stationary. Relative movement between the first and second components ceases and they become welded together. If desired, additional force may be applied by the ram 40 to press the components together more tightly when relative movement between the components has ceased but the exercise of additional force may well be unnecessary.

It will be appreciated that when the sleeve 35 is at any intermediate position the rods 9 and 16 are partially out of phase with the rods 10 and 17 and that the resultant movement of the pistons 14 and 19 remains simple harmonic motion but is of reduced amplitude.

The weight of the counterweight 22 is such that the inertial load of the piston 14, the rod 13 and the carrier 38 is balanced by the inertial load of the piston 19, the rod 18 and the counterweight 22. If desired, a load equal to the weight of the component 36 may be attached to the counterweight 22 in order fully to balance the load.

The rods 9 and 16, however, like the rods 10 and 17, move in unison. To enable them to be dynamically balanced, each is provided with a counterweight 46 mounted on one end of an arm 47 centrally pivoted at 48 and of which the other end is connected to one or other of the rods 16 and 17 through a pivoted link 49. The counterweights are not shown to scale in FIG. 1. Furthermore, it is preferred to modify the arrangement illustrated in such a manner that the central pivots 48 of the arms 47 of the counterweights 46 are co-axial and that the centres of gravity of the counterweights move in parallel planes, each plane also containing the central plane of one of the bodies 23 and 31. Thus, each of the counterweights 36 may be thought of as lying above the plane of the sectioned parts of FIG. 1. In order to increase the symmetry of the construction, each of the rods 16 and 17 is preferably provided with two similar counterweights, each similar to the counterweights 46, but one lying above the plane of the sectioned parts of FIG. 1 and the other lying symmetrically below that plane. In this way, the combined centre of gravity of the two counterweights for the rod 16 lies permanently on the axis of the rod 16. Similarly the combined centre of gravity of the two counterweights for the rod 17 lies permanently on the axis of the rod 17.

When frictional heat is generated in the manner described above, there are cyclical variations in the frictional resistance; moreover, when the amplitude of reciprocation is progressively reduced to zero immediately prior to welding being effected, the frictional resistance also tends to vary quite considerably. In addition, the kinetic energy of each of the reciprocating parts varies from a minimum at the end of each stroke to a maximum at the middle of each stroke. In order to minimize these effects, the flywheels 28 and 33 provide an energy reservoir from which energy can be drawn or which can itself absorb energy both as required by the variations in frictional resistance and as required by the variations in kinetic energy of the reciprocating parts. The presence of the flywheels therefore helps to reduce cyclical variation in angular velocity that tend to occur as kinetic energy is exchanged between reciprocating and rotating parts. In practice there is still likely to be slight variation in the speed of rotation of the flywheels and therefore in the frequency of the reciprocatory movements, but this normally has no significant effect on the welding process. On the other hand it does enable a less powerful motor 30 to be used than would be needed if there were no flywheels.

It will be appreciated from FIG. 2 that the centre of gravity of the eccentric pin 27 and the slide-block 25, 26 lies at a point eccentric with respect to the axis of rotation of the drive shaft 29. In order to compensate for this it is preferred to modify the shape of the flywheels 28 so that their combined centre of gravity is also eccentric with respect to the axis of rotation of the drive shaft 29 but is diametrically opposed to the centre of gravity of the eccentric pin and slide-block. The necessary modification may consist in the addition of appropriately positioned weights to the periphery of the flywheels or the removal of material from the flywheels. The latter is preferred. Exactly the same expedient is used with the flywheels 33 to balance the pin 32 and its associated slide-block 31.

A problem that may arise when using the apparatus illustrated in FIGS. 1 and 2 is that the movement of the counterweight 22 may not be exactly out of phase with respect to the movement of the rod 13. In order to avoid that problem completely it may sometimes be preferred to employ a modified form of apparatus of the kind illustrated in FIGS. 3 and 4. Part of the apparatus is similar to that shown in FIGS. 1 and 2, and similar parts are given the same reference numerals In the apparatus shown in FIGS. 3 and 4, however, the balancing means 2 is omitted and is replaced by other forms of balancing means now to be described.

A transverse beam 50 is secured to the rod 13 and has blocks 51 and 52 at its outer ends. Each of those blocks is coupled to an associated balancing device. As the two balancing devices are similar to each other only one of them—that associated with the block 51—will be described. The balancing device includes a flexible metal blade 53 anchored at one end to the block 51 and at the other end to a block 54 which is secured to one end of a rocker bar 55. The rocker bar 55 is rotatable about a central pivot pin 56 which is mounted on a fixed part of the apparatus (not shown). At its outer end the rocker bar carries a block 57 to which is anchored one end of a flexible metal blade 58. The other end of the blade 58 is anchored to a counterweight 59 which is slidably mounted in apertures in fixed guide plates 60.

In use, when the rod 13 reciprocates, the rocker bars 55 oscillate about their pivot pins 56 and the counterweight 59 are caused to reciprocate along rectilinear paths parallel with the path of the rod. As the rod 13 moves in one direction the counterweights move in the other. The use of the flexible blades 53 and 58 enables the numbers of pivotal connections to be much reduced; this is highly desirable as any such links would in use be subjected to heavy loads repeatedly and rapidly reversing in direction.

Each of the rods 16 and 17 is also provided with its own balancing means. As their construction and operation are identical only that associated with the rod 16 is illustrated, this being shown somewhat schematically in FIG. 4. The rod 16 is provided with upper and lower balancing means 61, and 62 and as they are of similar design to each other only the upper balancing means 61 will be described. This comprises a centrally pivoted rocker bar 63 similar to the rocker bar 55. One end of the rocker bar is connected to the rod 16 by a flexible metal blade 64 similar to the blade 53 and the other end of the rocker bar is connected to a counterweight 65 by a flexible metal blade 66 similar to the blade 58. The counterweight 65 is similar to the counterweight 59 and is slidable in aligned apertures in fixed guide plates 67 similar to the fixed guide plates 60. In use, as the rod 16 reciprocates the counterweight reciprocates in a complementary manner but its reciprocatory movement is 180° out of phase with that of the rod.

At the end of each welding operation it may be necessary or desirable to centre each of the pistons 14 and 19 in case it has shifted slightly from its correct base position. Centering means of the kind shown in FIG. 5 may be used for this purpose. The centering means is used for piston 14. Similar centering means may be employed for piston 19 if balancing means 2 is provided. The piston rod 13 is provided with a laterally projecting stop 68, outside the housing 3. Two hydraulic piston-and-cylinder units 69 and 70 are provided, one on either side of the stop. The cylinders of the units are fixed relative to the base or stand of the apparatus (not shown). During frictional generation of heat the piston rods 71 and 72 respectively of the units are withdrawn by their pistons to allow free reciprocation of the stop 68. When reciprocation has finished, however, the piston rods are advanced and locate the stop between their ends. The force exerted by the piston rod 72 is greater than that exerted by the rod 71, but the travel of the rod 72 is limited by a spacing collar 73 of predetermined axial length. In consequence, the position of the rod 72 is determined by the spacing collar, while the stop 68 is brought into contact with the rod 72 (if not already in contact with it) by the lesser force exerted by the rod 71. Alternatively, or in addition, the piston rod 13 may be formed with a transverse hole of circular cross-section and having a cylindrical inlet portion, a cylindrical outlet portion of smaller diameter than the inlet portion and a frusto-conical central portion extending between them. A centering pin of a shape complementary to that of the hole is inserted into the hole and, as it moves axially into place, centres the rod 13.

To enable any necessary centering movement of the rod 13 to be brought about by the units 69 and 70 or by the centering pin, it is necessary to provide for a free flow of hydraulic fluid into or out of the chambers 7 and 8. While it may be sufficient merely to allow fluid to flow into or out of each of the chambers to the relatively small extent that may result from the centering of the rod, it is envisaged that the opportunity may be taken to replace all or much of the fluid in each chamber with fresh fluid. The reason for this is that during each welding operation it is likely that the hydraulic fluid will become heated and will need replacement by cold fluid before the next welding operation.

Whichever of these arrangements is adopted in connection with the piston 14, rod 13 and the chambers 7 and 8, a similar arrangement is preferably used additionally in connection with the corresponding parts of the balancing means 2 when such is provided.

An alternative mechanism for adjusting the phase between the eccentrics is illustrated in FIG. 6, this mechanism having at least two advantages, one being that the adjustment means is not disposed between the eccentrics, thereby permitting more freedom in the design, and another being that the eccentric further from the motor is not itself driven through the intermediary of the other eccentric.

In the mechanism shown somewhat diagrammatically in FIG. 6, the motor 30 drives a shaft 74 which carries at its further end a pair of spaced flywheels 75 equivalent to the flywheels 33, and an eccentric 76 with an eccentric bore. The eccentric 76 is keyed to the shaft 74 and is equivalent to the eccentric pin 32. A tubular sleeve 77 is also mounted on the shaft 74 but is rotatable relative to the shaft. A pair of spaced flywheels 78 is keyed to the sleeve near one end thereof, and between them an eccentric 79, equivalent to the eccentric pin 27, is keyed to the sleeve. That end part of the sleeve 77 nearer the motor 30 is counterbored so that a cylindrical gap is left between that part of the sleeve and the shaft 74 within it. An axially movable collar 80 is housed within the gap. The counterbore of the sleeve is formed with helical splines which mate with complementary grooves in the circumferential surface of the collar 80. The adjacent part of the shaft 74 is formed either with longitudinal splines or with helical splines of the opposite hand, the splines mating with complementary grooves in the bore of the collar. Thus it will be appreciated that when the collar 80 is in any given axial position along the shaft 74, the eccentrics 76 and 79 are in a fixed angular relationship, but when the collar is moved axially along the shaft the angular relationship between the eccentrics is changed.

An hydraulic piston-and-cylinder unit (not shown) is used for moving the collar 80 axially and thus for changing the relative angular relationship between the eccentrics. The connection between the collar and the unit is, of course, such as to permit rotation of the collar.

In each of the forms of apparatus described herein it is preferred to arrange for the hydraulic fluid in the chambers to be under pressure, at least during the operation of the apparatus. Owing to the inertial and frictional forces acting on or transmitted to the rod 13 and piston 14, the pressure in each of the chambers 7 and 8 fluctuates considerably during each stroke. Pressurisation of the fluid ensures that the pressure in each chamber remains positive. After each weld has been performed it is preferred to reduce the pressure of the fluid to atmospheric pressure and to permit fluid to flow unrestrictedly in and out of the chambers. This enables re-centering of the rod 13 to be effected as described above with reference to FIG. 5. Moreover, it is preferred, after each weld has been performed, to discharge the fluid from the chambers and to refill them with fresh fluid. This may comprise or include previously unused fluid but preferably consists largely or wholly of previously used fluid that has been cooled, filtered or otherwise treated.

When apparatus embodying the present invention is in use, the period taken for it to generate frictional heat for welding is likely to last for no more than a few seconds. It is expected that the period would be no longer than 15 seconds or 20 seconds at the most. Nevertheless, unless suitable steps are taken there is likely to be a leakage of hydraulic fluid from one or more of the chambers. One way of avoiding or at least reducing that problem is to seal the chambers in a conventional manner using sealing rings through which the reciprocating parts pass. Such an arrangement is illustrated schematically in FIG. 1 where an annular sealing ring is present at each place that a reciprocating part passes through a hole in a stationary part. Alternatively, at each place where are of the pistons 14 and 19 or one of the rods 9, 10, 13, 16, 17 and 18 extends through a hole in a wall of one of chambers there may be provided a corrugated sleeve capable of axial compression and extension, one end of the sleeve being sealed to the chamber wall and the other end of the sleeve being sealed to the piston or rod as the case may be. Such an arrangement is entirely fluid-tight. Another way of overcoming or reducing the problems arising from leakage is to provide a source of hydraulic fluid under pressure for each of the chambers and to allow it to enter the associated chamber either through a non-return valve or through a passageway affording high resistance to flow, such as a fine capillary tube. In either case, any reduction in fluid-pressure in a chamber owing to leakage would lead to the introduction of fluid into that chamber to replace the fluid that had leaked away. Leakage inside the reciprocator 1 may in part be prevented by removing completely that part of the rod 9 that extends between the enlarged portions 11, and likewise by removing completely that part of the rod 10 that extends between the similar enlarged portions of the rod 10. The holes in the dividing wall 6 through which those parts of the rods 9 and 10 extended are blocked up, and the enlarged portions 11 are rigidly interconnected externally of the housing 3, while the similar enlarged portions of the rod 10 are similarly interconnected. The enlarged portions 11 and thus constrained to move in unison and similarly the enlarged portions of the rod 10 are also constrained to move in unison, but no longer to the rods 9 and 10 extend through the dividing wall 6. The diameters of the enlarged portions are reduced to compensate for the removal of the parts of the rods previously interconnecting them.

British patent application No. 8728632 (2 199 783 A) discloses related friction welding apparatus. The present apparatus may be modified to incorporate equivalent parts from that earlier apparatus.

I claim:

1. A friction welding reciprocator for welding components together through relative reciprocating movement comprising means defining a first chamber containing a substantially fixed volume of hydraulic fluid, means defining a second chamber containing a substantially fixed volume of hydraulic fluid, reciprocable driving means comprising a plurality of individual reciprocable elements, a reciprocating mechanism connected to said reciprocable elements for reciprocating said reciprocable elements to cause a local variation in the shape and volume of said first chamber and a complementary local variation in the shape and volume of said second chamber, said reciprocating mechanism being couplable to said reciprocable elements for causing reciprocation of said elements at the same frequency with unvarying amplitudes, driven means driven in reciprocating fashion by said reciprocating mechanism, and adjustment means for adjustably varying the relative phases of reciprocation of said reciprocable elements by said reciprocating mechanism to a condition where the sum of the said local variations in shape and volume of each of said chambers resulting from movement of said reciprocable elements is reduced to zero thereby achieving an amplitude of reciprocation of said driven means of zero.

2. A reciprocator according to claim 1 including respective rotary members associated with each reciprocable element, a respective conversion mechanism associated with each said rotary member for converting rotational movement of a rotary member to reciprocatory movement of the respective reciprocable element, and said adjustment means being operable for varying the rotary positions of said rotary members while they are rotating, thereby adjusting the relative phase of reciprocation of said elements.

3. A reciprocator according to claim 1 including balancing means comprising moveable counterweight means and operating means, and said operating means being coupled to said counterweight means such that said counterweight means is moved in opposition to the reciprocal movement of a component to be welded.

4. A reciprocator according to claim 3 in which said counterweight means is mounted for reciprocatory movement, and pivotable rocker means coupling a component to be welded to said counterweight means by flexible elements which flex to accommodate relative movement between said rocker means and said counterweight means and between said rocker means and said reciprocatory component.

5. A reciprocator according to claim 1 in which said driven means is moveable by said reciprocable driving means with a smaller amplitude but larger force than said elements.

6. A reciprocator according to claim 1 in which said first and second chambers are disposed on opposite sides of a common dividing wall and said driving means extends through at least one hole in said dividing wall.

7. A reciprocator according to claim 5 in which said first and second chambers are disposed on opposite sides of a common dividing wall, and said driven means extends through a hole in said dividing wall.

8. A reciprocator according to claim 2 including at least one flywheel means for temporarily absorbing energy when there are changes in frictional resistance between components to be welded together and for reducing cyclical variation in angular velocity that tends to occur as kinetic energy is exchanged between reciprocating elements and rotary members.

9. Friction welding apparatus for use in welding together first and second components by reciprocating movement comprising a friction welding reciprocator comprising means defining a first chamber containing a substantially fixed volume of hydraulic fluid, means defining a second chamber containing a substantially fixed volume of hydraulic fluid, reciprocable driving means comprising a plurality of individual reciprocable elements, a reciprocating mechanism operatively connected to said reciprocable elements for reciprocating said reciprocable elements to cause a local variation in the shape and volume of said first chamber and a complementary local variation in the shape and volume of said second chamber, said reciprocating mechanism being couplable to said reciprocable elements for causing reciprocation of said elements at the same frequency with unvarying amplitudes, driven means driven in reciprocating fashion by said reciprocating mechanism, adjustment means for adjustable varying the relative phases of reciprocation of said reciprocable elements to a condition where the sum of the said local variations in shape and volume of each of said chambers resulting from movement of said reciprocable elements is reduced to zero thereby achieving an amplitude of reciprocation of said driven means of zero, first carrier means coupled to the driven means for carrying said first component for reciprocating movement, second carrier means for carrying said second component, and urging means for urging said second carrier means towards said first carrier means whereby said first and second components carried by said carrier means are pressed together.

* * * * *